(12) United States Patent
Hartel et al.

(10) Patent No.: US 9,262,549 B2
(45) Date of Patent: Feb. 16, 2016

(54) MODELED ASSOCIATIONS FOR BUSINESS OBJECT DATA STRUCTURES

(71) Applicants: Michael Hartel, Heidelberg (DE); Adam Polly, Stutensee (DE); Tilmann David Kopp, Karlsruhe (DE); Daniel Zoch, Walldorf (DE)

(72) Inventors: Michael Hartel, Heidelberg (DE); Adam Polly, Stutensee (DE); Tilmann David Kopp, Karlsruhe (DE); Daniel Zoch, Walldorf (DE)

(73) Assignee: SAP SE, Walldorf (DE)

( * ) Notice: Subject to any disclaimer, the term of this patent is extended or adjusted under 35 U.S.C. 154(b) by 246 days.

(21) Appl. No.: 13/719,043

(22) Filed: Dec. 18, 2012

(65) Prior Publication Data

US 2014/0172895 A1    Jun. 19, 2014

(51) Int. Cl.
*G06F 17/30* (2006.01)

(52) U.S. Cl.
CPC .... *G06F 17/30905* (2013.01); *G06F 17/30327* (2013.01); *G06F 17/30589* (2013.01)

(58) Field of Classification Search
CPC .............. G06F 17/30386; G06F 17/30327; G06F 17/30589; G06F 17/30905
USPC ................ 707/758, 778, 797, 798
See application file for complete search history.

(56) References Cited

U.S. PATENT DOCUMENTS

| | | | | |
|---|---|---|---|---|
| 7,783,667 B2* | 8/2010 | Scheerer | G06Q 10/02 | 707/601 |
| 8,893,031 B2* | 11/2014 | Kornmann | G06Q 10/00 | 707/802 |
| 2007/0050449 A1* | 3/2007 | Beck | H04L 67/142 | 709/204 |
| 2007/0067254 A1* | 3/2007 | Chen | G06Q 10/10 | 707/999.001 |
| 2008/0120129 A1* | 5/2008 | Seubert | G06Q 10/06 | 705/35 |
| 2008/0162672 A1* | 7/2008 | Krasinskiy | G06F 9/541 | 709/220 |
| 2008/0278198 A1* | 11/2008 | Saterdag | G06F 9/44505 | 326/62 |
| 2008/0307433 A1* | 12/2008 | Zoch | G06F 9/52 | 719/315 |
| 2009/0077511 A1* | 3/2009 | Wahler | G06F 8/35 | 716/106 |
| 2009/0125531 A1* | 5/2009 | Scheerer | G06Q 10/06 | 707/999.1 |
| 2009/0164985 A1* | 6/2009 | Balko | G06Q 10/06 | 717/162 |
| 2009/0327199 A1* | 12/2009 | Weber | G06Q 10/06 | 706/48 |
| 2011/0082715 A1* | 4/2011 | Chen | G06Q 10/06 | 705/7.11 |
| 2011/0161342 A1* | 6/2011 | Boskamp | G06F 17/30477 | 707/769 |
| 2012/0029929 A1* | 2/2012 | Schaude | G06Q 10/06 | 705/1.1 |
| 2013/0086694 A1* | 4/2013 | Agrawal | G06F 9/468 | 726/28 |
| 2013/0159909 A1* | 6/2013 | Kornmann | G06Q 10/00 | 715/771 |
| 2013/0339792 A1* | 12/2013 | Hrastnik | G06F 11/3672 | 714/32 |

* cited by examiner

*Primary Examiner* — Phong Nguyen
(74) *Attorney, Agent, or Firm* — Mintz Levin Cohn Ferris Glovsky and Popeo, P.C.

(57) ABSTRACT

A service request to execute an operation on a business object is received. Thereafter, a metadata repository is polled to obtain a modeled association corresponding to the service request. The modeled association involves at least one node of the business object. The at least one node of the business object is then called using the modeled association to respond to the service request. Related apparatus, systems, techniques and articles are also described.

20 Claims, 7 Drawing Sheets

MODELED ASSOCIATIONS FOR BUSINESS OBJECT DATA STRUCTURES

TECHNICAL FIELD

The subject matter described herein relates to the use of modeled associations to access bound nodes of business object data structures.

BACKGROUND

Business objects encapsulate semantically related functionality and structure. A business object can include a hierarchy of semantically related nodes, which represent data as attributes. In addition, a business object can be an independently viable entity with identifiable instances as well as bundle functions and data, both of which may be accessible from outside of the business object. Business objects can be described by a data model, an internal process model, and one or more typed service interfaces, and can be a core structuring element of applications that are centrally defined by a developer as part of an overall governance process.

The dependency between instances of two nodes of a business object can be expressed by the help of associations. An association can be a direct, unidirectional, binary relationship between two business object nodes. Each association can be used to navigate from one node (source node) to the related node (target node). In addition, associations can have parameters to filter the result of the associated nodes and/or have a defined multiplicity which gives information about the number of associated nodes.

SUMMARY

In one aspect, a service request to execute an operation on a business object is received. Thereafter, a metadata repository is polled to obtain a modeled association corresponding to the service request. The modeled association involves at least one node of the business object. The at least one node of the business object is then called using the modeled association to respond to the service request.

The modeled association can take a variety of forms. The modeled association can be a composition association that defines a relationship leading from a parent node of the business object to a child node of the business object. The modeled association can be a 'to parent' association that defines a relationship leading from a child node of the business object to its corresponding parent node. The modeled association can be a 'to root' association that defines a relationship leading from a node of the business object to a root node of the business object. The modeled association can be a cross business object foreign key that binds a node of the business object with a node of the second business object. The modeled association can be an association valuation. The association value can specify an operator binding a specified target node with a specified source node, and/or an operator binding a specified target node to a constant value, and/or an operator binding a specified target node to a built-in value. The modeled association can be a reflexive association.

Computer program products are also described that comprise non-transitory computer readable media storing instructions, which when executed one or more data processor of one or more computing systems, causes at least one data processor to perform operations herein. Similarly, computer systems are also described that may include one or more data processors and a memory coupled to the one or more data processors. The memory may temporarily or permanently store instructions that cause at least one processor to perform one or more of the operations described herein. In addition, methods can be implemented by one or more data processors either within a single computing system or distributed among two or more computing systems.

The subject matter described herein provides many advantages. For example, the current subject matter allows associations to be evaluated generically which in turn, increases development efficiency and improves usability. The current subject matter is also advantageous in that it allows for the evaluation of an association on a database level analogous to a join condition. This aspect improves performance of association processing. Furthermore, the current subject matter is advantageous in relation to implemented associations it obviates the need for classes, which differ from association to association, to be registered in the definition of each business object and to provide results of relationships.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
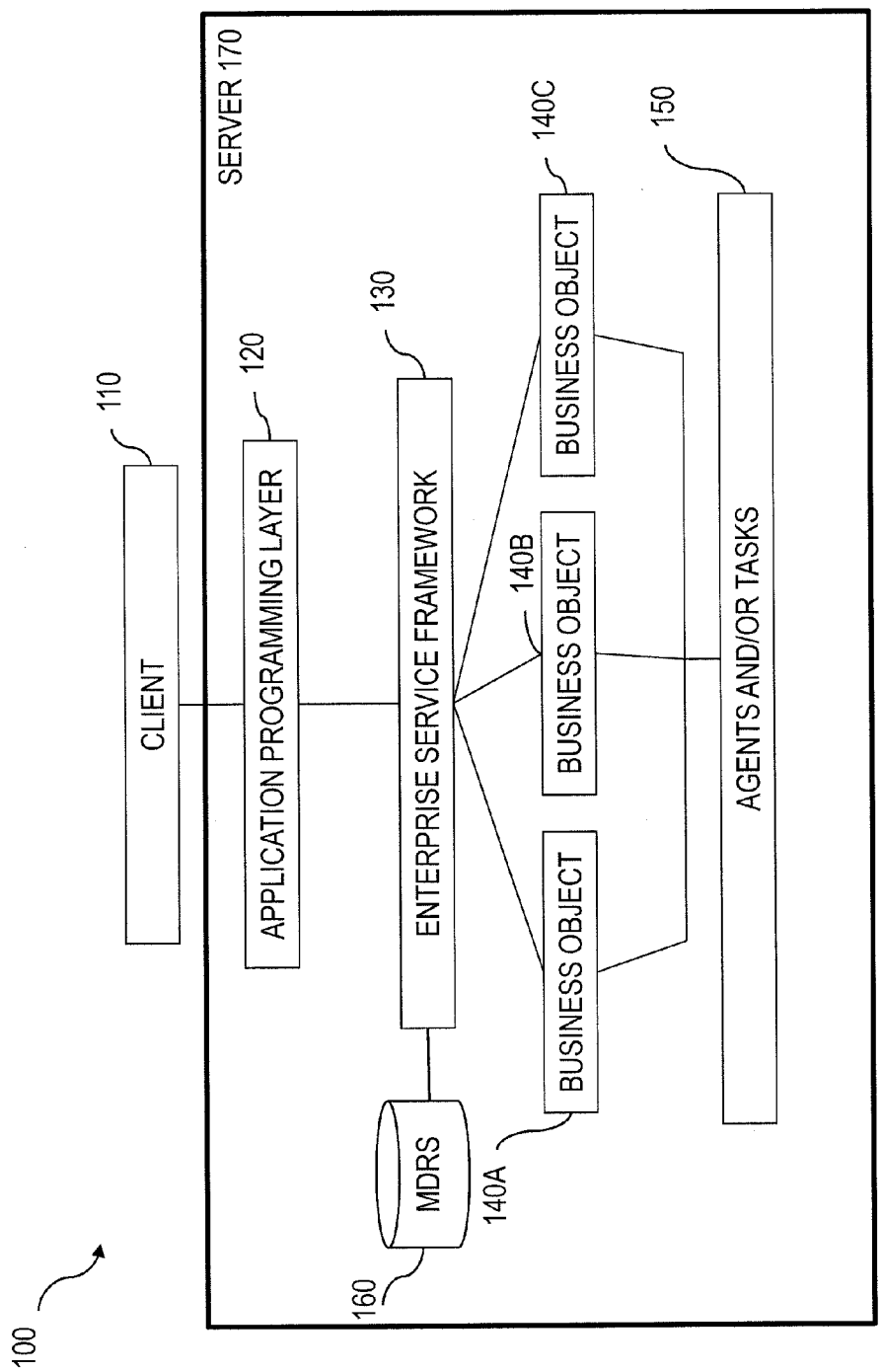
FIG. 1 is a process flow diagram illustrating an architecture for implementing selective locking of business object data structures, according to one or more embodiments.

FIG. 1 illustrates a system 100 for processing of data structures, such as business object data structures (also referred to herein as "business objects" or "business object instances"). The system 100 can process and store business object data (e.g., the data fields of a business object). Examples of processing can include: determining consistency of data of a data object, such as a business object including data; performing saving procedures to store data within a database and/or a repository; performing updates to data that can be in a business object (e.g., updates due to newly created, entered, and/or or saved data); and performing any other tasks that can manipulate, maintain and/or store data in the data objects. The system 100 can be used to process various business objects (e.g., data structured according to a task, such as sales orders, purchase orders, etc.).

A client application 110 can be used to enter, modify, update, etc. various data that can be processed and eventually passed onto a business object 140 for storage, retrieval, etc. The client application 110 can interact with an application processing layer 120 (such as those encoded in the Advanced Business Application Programming (ABAP) language) for the purposes of processing the data, such as, for example, creating sales orders, writing and editing reports and module pools, processing database table definitions, designing user interfaces, designing screens and flow logic, building function modules, etc.

A server 170 can be implemented as at least one processor and at least one memory and can include the application processing layer 120, an enterprise services framework 130, business objects 140, agents 150, and a metadata repository (MDRS) 160.

The application processing layer 120 can interact with a framework (e.g., an enterprise service framework ("ESF") 130). An example of an ESF is commercially available from SAP AG, Walldorf, Germany. The term "framework" can refer to a system of interrelated components, such as programs and the like, providing a business system for performing business functions. The ESF 130 can be configured to interact with at least one business object 140. The ESF 130 can abstract the business objects 140, which can be modeled as services (also referred to as enterprise services) providing, for example, purchase order generation, sales order generation, and the like. Aggregating services into business-level enterprise services can provide more meaningful building blocks for the task of automating enterprise-scale business scenarios.

The ESF 130 can include a persistence repository for storing relevant pre-existing enterprise services, which can be made available to selected users. By using a repository, these selected users can use the pre-existing enterprise services to aid in the implementation of new services and corresponding business objects 140. As noted, the business object can represent an object, such as a data structure including data and operations, of significance to a business. Examples of business objects can include a purchase order, a sales order, a flight reservation, a shipping order, customer information, employee information, and the like. A service can thus provide an interface to enable other services and applications to access and process (e.g., create, fill-in, save, query, delete, print, send, and the like) the business object 140.

Business objects 140 and data related to business objects can be stored in a storage mechanism, such as a database or any other persistent storage repository. Metadata relating to the business objects 140 can be stored in the MDRS 160. The system 100 can include an agent 150, which can be initiated upon receipt of data related to the business objects 140. For example, agent 150 can be used to perform various tasks, such as update information related to business objects stored in the database, further process the data, determine the order of storing the data, perform various database update tasks, etc. In some implementations, agents can serve as a bridge or a proxy for tasks, which can be executed after an initial task has been completed. In this case, agents can collect data and transform it in such a way so that the tasks can be processed later on by other components in the system 100. Agents can be configured to generate a message as output. The message may be provided to components in the system 100. Examples of agents may include at least one of the following: an output management agent, a task agent, an application agent, a business information agent, a business-to-business messages agent, and others. The output management agent can collect data for generating a form, which can be sent to a printer or via an email to a recipient. The task agent can collect information that may be needed to process a task and send the information to a recipient (e.g., for approval). The application agent can collect data that can be needed for a process in another application area. The business information agent can collect data for notification of a business information warehouse. The business-to-business messages agent can collect data that can be used to send information to an external business partner (e.g., information can be sent from a buyer to a supplier). To ensure global data consistency, the agents 150 can collect data during a current session of the system 100.

The MDRS 160 can be characterized as an infrastructure to support definition, storing, and provisioning of structured metadata. In particular, the MDRS 160 can provide metadata used by the ESF 130 that characterizes the business objects 140 to allow the business objects 140 responsive to a service request to be identified, accessed, and otherwise consumed.

The ESF 130 can generate a message indicating that the data that the client 110 entered has been successfully saved in the system 100. In addition, the ESF 130 can generate a message indicating that the data that the client 110 entered was not saved and/or that such data is locked. Such messages can be presented to the client 110 via a user interface in the form of a message, such as a Hypertext Markup Language ("HTML") message. For example, in some implementations, if a sales order object is being created and saved by the client 110, the HTML message indicating successful storage of the data can also include a sales order number which can confirm that a particular sales order has been created and saved to the system 100. In some implementations, the message generated by the ESF 130 can be presented by automatically updating of the client's user interface, or by sending an email, an instant message, a text message, a multimedia message, etc. to the client 110, or in any other form. In order to save the business object data to the system 100, the system 100 can be configured to perform a save-and-exit procedure.

The MDRS 160 can store modeled associations which are used by the ESF 130 when traversing or otherwise accessing nodes of one of the business objects 140. In particular, the ESF 130 can respond to an access request for a particular business object 140 that originates from the client 110 by accessing the MDRS 160 and obtaining the corresponding modeled association. Various types of modeled associations can be provided including, but not limited to, compositions, to parent associations, to root associations, and cross business object associations, which are further discussed below.

Modeled associations can be evaluated (i.e., utilized during runtime) in one of two ways. First, modeled associations can be implemented in ABAP and they can use buffered data in ABAP. This type of evaluation is used in transactional use cases and it can operate data that is not persisted (e.g., maintenance or change scenarios such as creating or updating a sales order). Such a modeled association can have a generic implementation that exists for all associations as opposed to an association-dependent implementation. The second type of evaluation only works on persistent data and is used in read-only scenarios (e.g., listings of sales orders, reading of master data for an order, etc.). This type of evaluation is performed at the database level and can be very fast.

Figure 2:
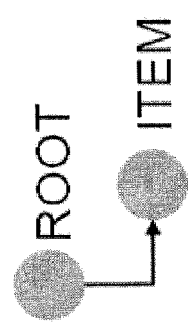
FIG. 2 is a diagram illustrating a composition modeled association, according to one or more embodiments.

Compositions, as used herein, are associations between a parent node and its child node. With reference to the diagram 200 of FIG. 2, each node of a business object has exactly one parent node (with the exception of the root node). A composition can be automatically created as soon as a new child node is defined in the MDRS 160 utilized by the ESF 130. These compositions can then be used by the ESF 130 when answering various service requests to bind a parent node to one of its child nodes. The names given to compositions can be derived from their target node (e.g., ITEM).

Figure 3:
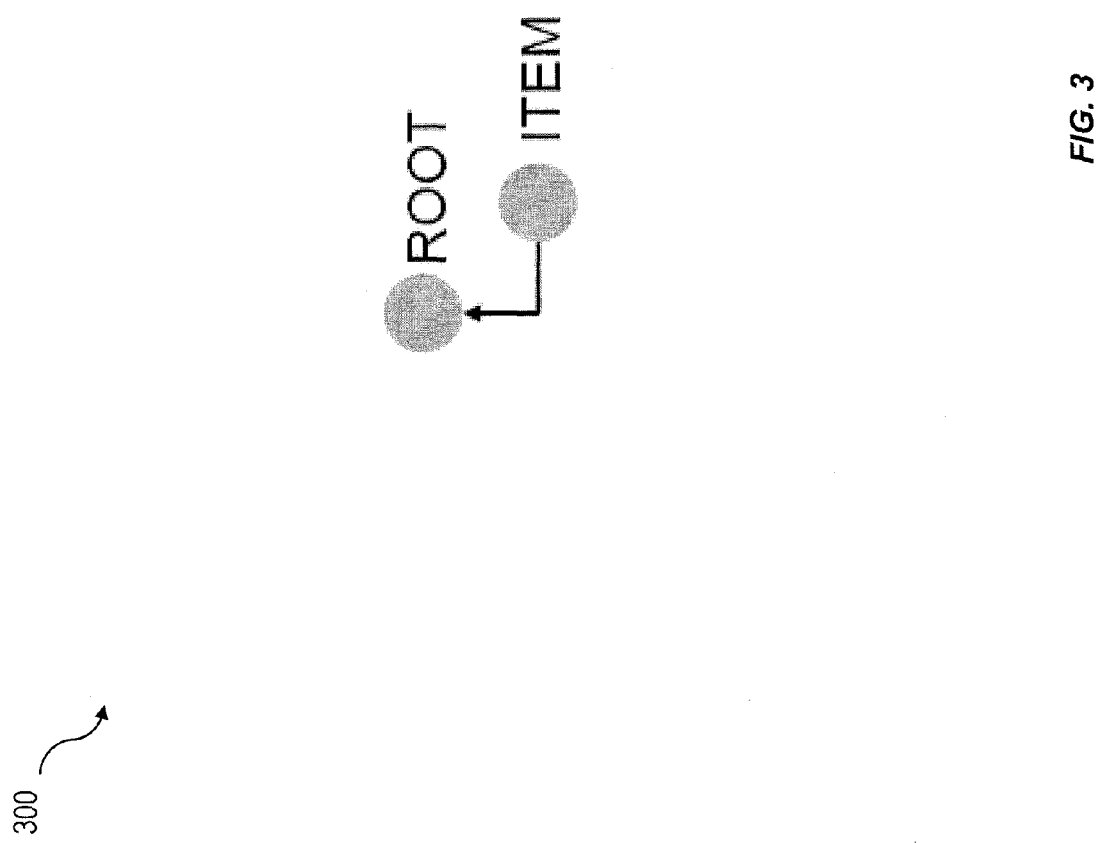
FIG. 3 is diagram illustrating a to parent modeled association, according to one or more embodiments.

With reference to diagram 300 of FIG. 3, to parent associations can be characterized as the counterpart of compositions in that they lead from a child node to its parent node. To parent associations can be automatically built as soon as a new subnode is created in the MDRS 160.

Figure 4:
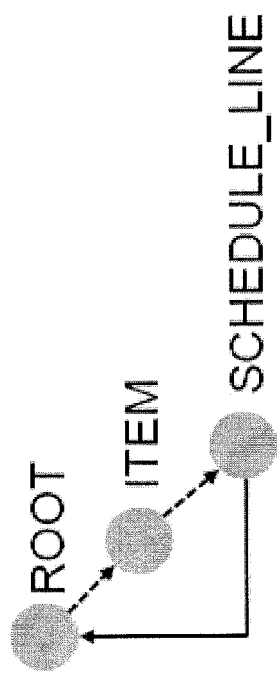
FIG. 4 is diagram illustrating a to root modeled association, according to one or more embodiments.

With reference to the diagram 400 of FIG. 4, to root associations can lead from an arbitrary subnode instance to the business object root node instance. In this example, the subnode instance is the schedule line. To root associations can be automatically built as soon as a new subnode is created in the MDRS 160. To root associations can, in some implementations, not be shown in the MDRS 160, but can be used via Typed LCP like any other association.

Figure 5:
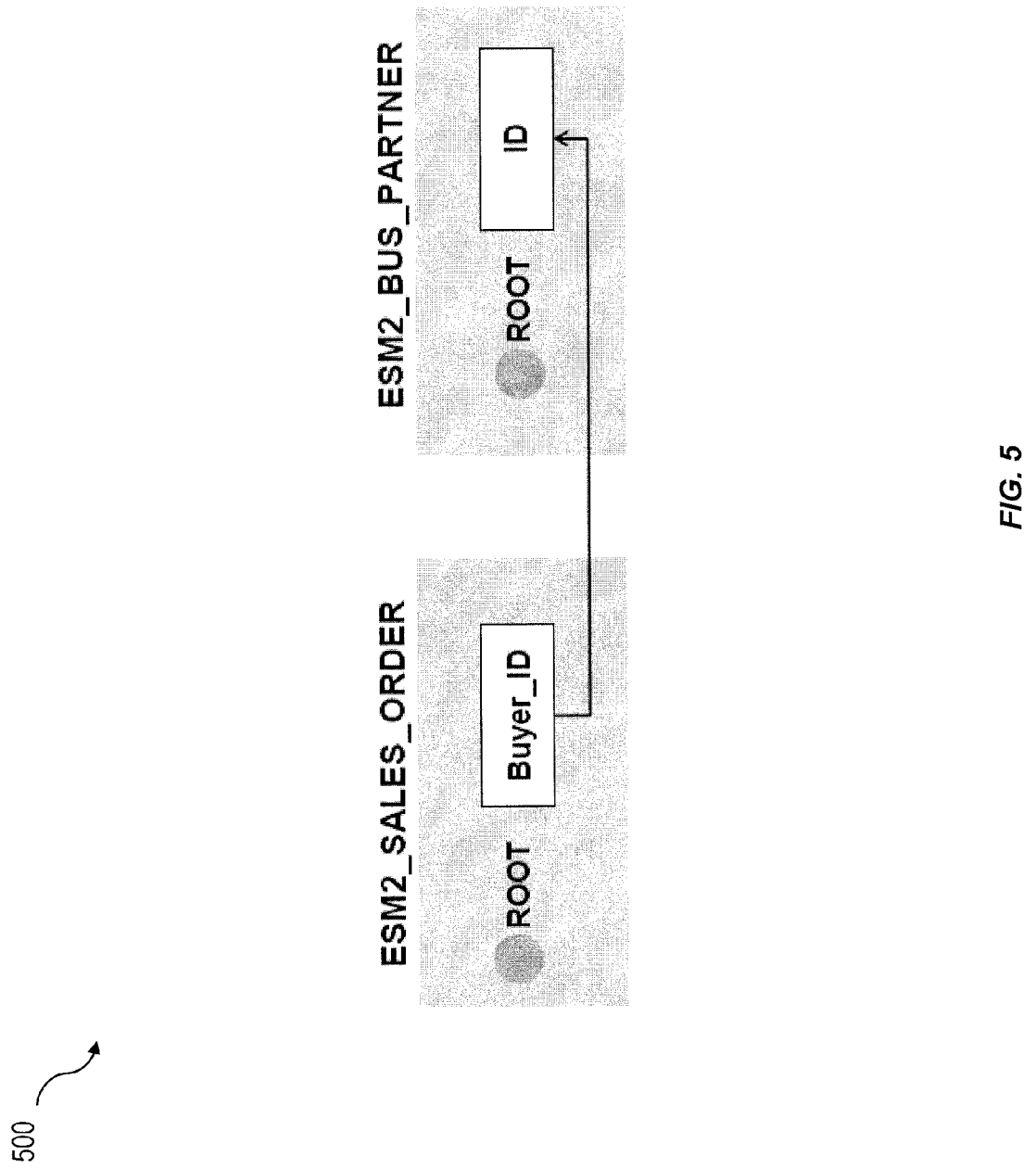
FIG. 5 is a diagram illustrating a cross business object foreign key association, according to one or more embodiments.

FIG. 5 is a diagram 500 that provides an illustration of a cross business object foreign key association. With this example, the source node (forming part of a business object ESM2_SALES_ORDER) can store a value referencing a unique alternative key located at a node of a foreign business object (ESM2_BUS_PARTNER). In this case, a foreign business object reference means binding of a node from a first business object to a node of a second distinct business object.

Figure 6:
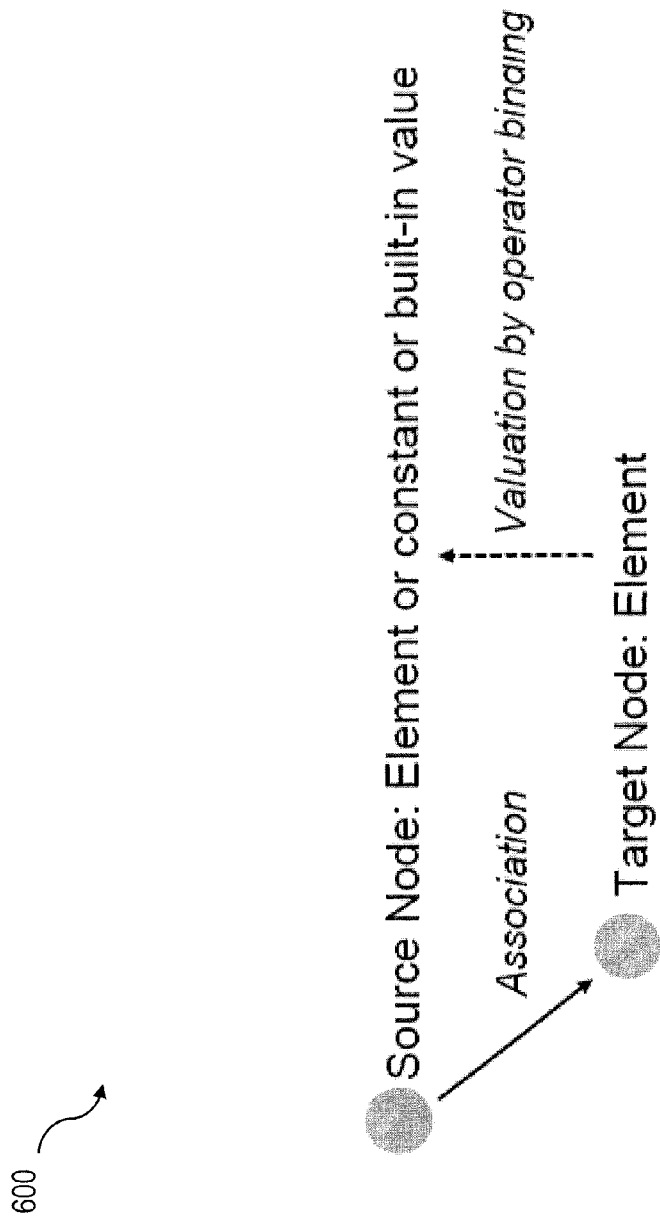
FIG. 6 is a diagram illustrating an association described by a valuation condition, according to one or more embodiments.

With reference to diagram 600 of FIG. 6, an association, whose logic can be described by valuation conditions can be modeled with its conditions in the MDRS 160 and can be automatically handled by the ESF 130 during runtime (i.e., implemented associations are not required, etc.). In other words, an operator binding (e.g., equal, greater than, less than, etc.) can be defined between a target node element (i.e., a field of a business object node) and a source node element. The operator can define whether or not such a binding exists based on values of the corresponding elements. The ESF 130 runtime need not distinguish between an intra and a cross business object association valuation, or between association valuations originating from a core business object or from an extension business object, with the limitation that an extension field (extending an existing core business object node) cannot be used for a valuation condition. In particular, a valuation condition can be based on an operator binding of a target node element to a source node element, a constant, and/or to a built-in value.

Associations which have as target node an ESF 130 object node can also have the type modeled association, if they can be expressed by valuation conditions. Consequentially, the associations can be handled by the ESF 130 during runtime and an implementation is not required. Filter parameters can be defined in addition to the valuation conditions.

In some cases, a modeled association can be a reflexive association in which a source node and a target node are the same node.

Figure 7:
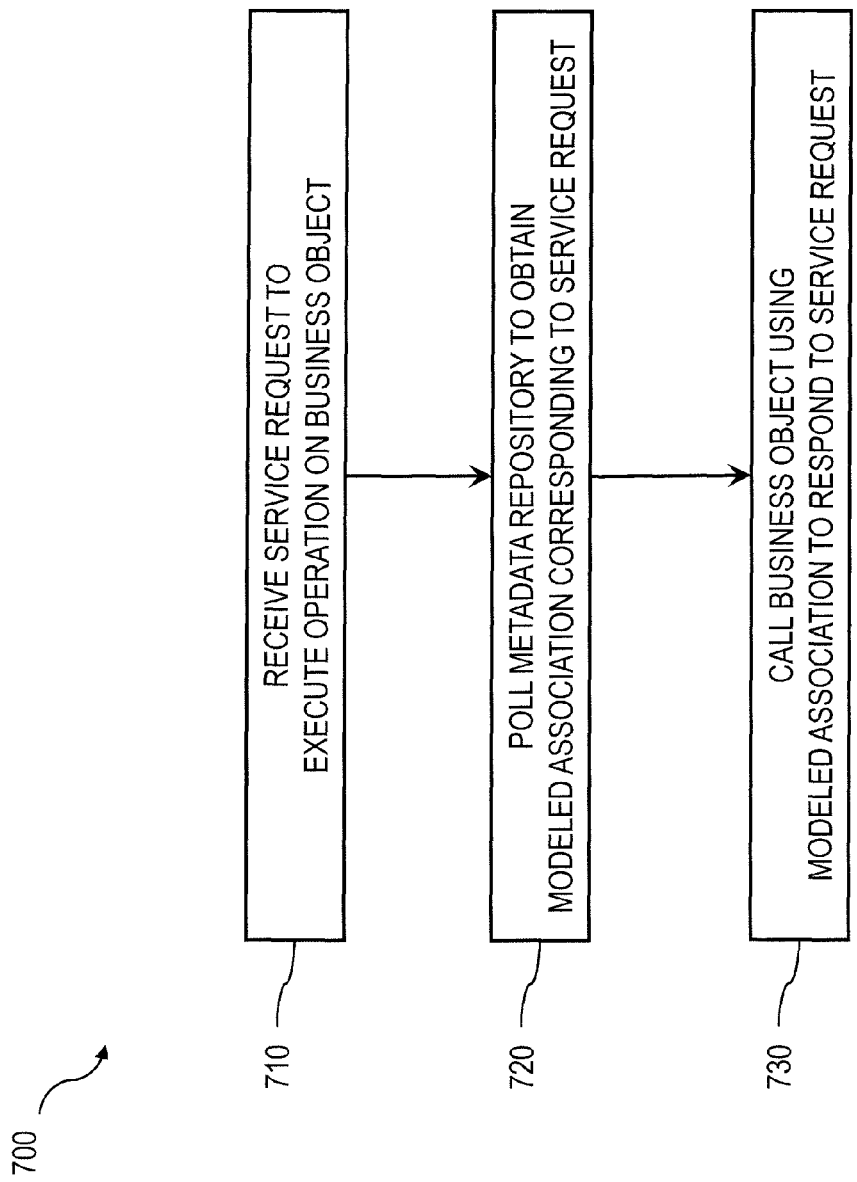
FIG. 7 is a process flow diagram illustrating runtime use of modeled associations, according to one or more embodiments.

FIG. 7 is a diagram 700 illustrating a run-time method in which, at 710, a service request is received to execute an operation (e.g., an access operation) on a business object. Thereafter, at 720, a metadata repository is polled to obtain a modeled association corresponding to the service request that involves at least one node of the business object. The metadata repository can be polled by identify the business object and/or one or more aspects of the service request (e.g., particular nodes requested, etc.) Subsequently, at 730, the at least one node of the business object is called using the modeled association to respond to the service request. The modeled association is used to navigate the business object node(s) in order to answer the service request.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, functional programming language, logical programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and an interface such as a touch screen and/or a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. A method for implementation by one or more data processors forming part of at least one computing system comprising:

receiving, by at least one data processor, a service request to execute an operation on a business object;

polling, by at least one data processor, a metadata repository to obtain a modeled association corresponding to the service request, the modeled association involving at least one node of the business object, the metadata repository containing a plurality of modeled associations, including the modeled association, modeled using at least one valuation condition in a plurality of valuation conditions corresponding to different types of modeled associations, where the plurality of valuation conditions excludes an extension field; and calling, by at least one data processor during runtime, the at least one node of the business object using the modeled association and without regard for the type of modeled associations to define how to traverse the business object in order to respond to the service request.

2. A method as in claim 1, wherein the modeled association is a composition association that defines a relationship leading from a parent node of the business object to a child node of the business object.

3. A method as in claim 1, wherein the modeled association is a to parent association that defines a relationship leading from a child node of the business object to its corresponding parent node.

4. A method as in claim 1, wherein the modeled association is a to root association that defines a relationship leading from a node of the business object to a root node of the business object.

5. A method as in claim 1, wherein the modeled association is a cross business object foreign key that binds a node of the business object with a node of the second business object.

6. A method as in claim 1, wherein the modeled association comprises an association valuation.

7. A method as in claim 6, wherein the association valuation specifies an operator binding a specified target node with a specified source node.

8. A method as in claim 6, wherein the association valuation specifies an operator binding a specified target node to a constant value.

9. A method as in claim 6, wherein the association valuation specifies an operator binding a specified target node to a built-in value.

10. A method as in claim 1, wherein the modeled association comprises a reflexive association.

11. A method as in claim 10, wherein at least one of the receiving, polling, and calling is implemented by at least one data processor forming part of at least one computing system.

12. A non-transitory computer program product storing instructions, which when executed by at least one data processor forming part of at least one computing system, result in operations comprising:

receiving a service request to execute an operation on a business object;

polling a metadata repository to obtain a modeled association corresponding to the service request, the modeled association involving at least one node of the business object, the metadata repository containing a plurality of modeled associations, including the modeled association, modeled using at least one valuation condition in a plurality of valuation conditions corresponding to different types of modeled associations, where the plurality of valuation conditions excludes an extension field; and calling, during runtime, the at least one node of the business object using the modeled association and without regard for the type of modeled associations to define how to traverse the business object in order to respond to the service request.

13. A computer program product as in claim 12, wherein the modeled association is a composition association that defines a relationship leading from a parent node of the business object to a child node of the business object.

14. A computer program product as in claim 12, wherein the modeled association is a to parent association that defines a relationship leading from a child node of the business object to its corresponding parent node.

15. A computer program product as in claim 12, wherein the modeled association is a to root association that defines a relationship leading from a node of the business object to a root node of the business object.

16. A computer program product as in claim 12, wherein the modeled association is a cross business object foreign key that binds a node of the business object with a node of the second business object.

17. A computer program product as in claim 12, wherein the modeled association comprises an association valuation.

18. A computer program product as in claim 17, wherein the association valuation specifies an operator binding a specified target node with one or more of a specified source node, a constant value, and a built-in value.

19. A computer program product as in claim 12, wherein the modeled association comprises a reflexive association.

20. A system comprising:

at least one data processor; and memory storing instructions, which when executed by the at least one data processor, result in operations comprising:

receiving a service request to execute an operation on a business object;

polling a metadata repository to obtain a modeled association corresponding to the service request, the modeled association involving at least one node of the business object and being implemented in Advanced Business Application Programming (ABAP) using buffered data that is not persisted, the metadata repository containing a plurality of modeled associations, including the modeled association, modeled using at least one valuation condition in a plurality of valuation conditions corresponding to different types of modeled associations, where the plurality of valuation conditions excludes an extension field; and calling, during runtime, the at least one node of the business object using the modeled association and without regard for the type of modeled associations to respond to the service request.

* * * * *